(12) United States Patent
Samburg et al.

(10) Patent No.: US 11,048,279 B2
(45) Date of Patent: Jun. 29, 2021

(54) LIQUID HANDLING SYSTEM MONITORING SYSTEMS AND METHODS

(71) Applicant: POINTWATCH SYSTEMS LLC, Vienna, VA (US)

(72) Inventors: Thomas Samburg, Vienna, VA (US); A. Gene Samburg, Arlington, VA (US); Eric Rud Larson, Milaca, MN (US); Joe Graham, St. Augustine, FL (US); Kevin Ernest Anderson, St. Augustine, FL (US); Dave Grundy, St. Augustine, FL (US)

(73) Assignee: POINTWATCH SYSTEMS LLC, Vienna, VA (US)

( * ) Notice: Subject to any disclaimer, the term of this patent is extended or adjusted under 35 U.S.C. 154(b) by 331 days.

(21) Appl. No.: 15/609,482

(22) Filed: May 31, 2017

(65) Prior Publication Data

US 2017/0344033 A1 Nov. 30, 2017

Related U.S. Application Data

(60) Provisional application No. 62/343,759, filed on May 31, 2016.

(51) Int. Cl.
*G05D 7/06* (2006.01)
*E03F 1/00* (2006.01)
(Continued)

(52) U.S. Cl.
CPC ........... *G05D 7/0676* (2013.01); *E03F 1/002* (2013.01); *E03F 7/00* (2013.01); *G01F 23/0076* (2013.01); *G01F 25/0061* (2013.01); *G05D 9/12* (2013.01)

(58) Field of Classification Search
CPC .. C02F 3/1242; C02F 2209/42; G01F 23/268; G01F 23/266; G01F 23/263; G01F 23/00;
(Continued)

(56) References Cited

U.S. PATENT DOCUMENTS 2,793,527 A * 5/1957 Turner, Jr. ........... G01N 27/121
324/448
3,460,011 A * 8/1969 Kadlec .................. G01F 23/263
361/282
(Continued)

FOREIGN PATENT DOCUMENTS

DE 3824663 A1 * 1/1989
JP 01209332 A1 * 8/1989

OTHER PUBLICATIONS

Dynamic Monitors, "Introducing Septic Sitter—Septic Tank & Drainfield Monitor & Alert System", available on the Internet Archive, Feb. 27, 2015. (Year: 2015).*
(Continued)

*Primary Examiner* — David A. Rogers
(74) *Attorney, Agent, or Firm* — DLA Piper LLP US

(57) ABSTRACT

A monitoring system for monitoring a liquid handling system may comprise at least one liquid level sensor and/or at least one gateway computer. The at least one liquid level sensor may be configured to monitor at least one liquid level of at least one liquid handling element. The at least one gateway computer may be in communication with the at least one liquid level sensor. The at least one gateway computer may be configured to receive sensor readings, report information describing the readings, identify at least one rule-triggering event, and perform an action in response to identifying the at least one rule-triggering event in accordance with at least one rule.

19 Claims, 11 Drawing Sheets

(51) Int. Cl.
  *E03F 7/00* (2006.01)
  *G01F 23/00* (2006.01)
  *G01F 25/00* (2006.01)
  *G05D 9/12* (2006.01)

(58) Field of Classification Search
  CPC .............. G01F 23/265; G01F 23/0007; G01F 23/0061; G01F 23/246; G01N 33/246; G01N 27/221; Y10T 137/189
  See application file for complete search history.

(56) References Cited

U.S. PATENT DOCUMENTS

| | | | | |
|---|---|---|---|---|
| 3,533,286 A * | 10/1970 | Blanchard | ............ | G01F 23/266 73/304 C |
| 3,580,074 A * | 5/1971 | Wescott | ................ | G01F 23/266 73/304 C |
| 3,844,946 A * | 10/1974 | Farrell, Jr. | ......... | B01D 21/0018 210/104 |
| 3,991,614 A * | 11/1976 | Ditzler | .................... | G01F 1/002 73/215 |
| 4,042,497 A * | 8/1977 | Maltby | ................... | C02F 3/046 210/744 |
| 4,119,860 A * | 10/1978 | Gooley | ............... | G01F 23/2921 250/577 |
| 4,445,788 A * | 5/1984 | Twersky | ................ | G01K 1/026 374/142 |
| 4,510,436 A * | 4/1985 | Raymond | ......... | G01R 27/2635 324/672 |
| 4,720,997 A * | 1/1988 | Doak | ................... | G01F 23/246 327/512 |
| 4,801,865 A * | 1/1989 | Miller | .................. | G01N 27/048 324/609 |
| 4,852,802 A * | 8/1989 | Iggulden | ............... | A01G 25/167 239/64 |
| 4,886,088 A * | 12/1989 | Ryokai | ................. | A01G 25/167 137/78.3 |
| 4,986,905 A * | 1/1991 | White | ..................... | C02F 3/006 210/104 |
| 5,018,387 A | 5/1991 | Myneni | | |
| 5,050,431 A * | 9/1991 | McDonald | ........... | D06F 39/087 340/620 |
| 5,676,828 A * | 10/1997 | Kallenbach | ............. | C02F 3/006 137/590 |
| 5,746,278 A | 5/1998 | Bischel | | |
| 5,813,606 A * | 9/1998 | Ziff | ..................... | A01G 25/167 239/63 |
| 6,014,029 A * | 1/2000 | Soto | .................... | G01N 27/221 137/78.3 |
| 6,138,508 A * | 10/2000 | Hannan | ................. | G01F 23/265 324/665 |
| 6,215,317 B1 | 4/2001 | Siddiqui | ............. | G01N 27/223 324/637 |
| 6,490,920 B1 * | 12/2002 | Netzer | .................... | G01C 9/06 324/687 |
| 6,891,838 B1 * | 5/2005 | Petite | .................. | H04L 12/2825 340/870.02 |
| 6,914,533 B2 * | 7/2005 | Petite | .................... | G01V 1/364 340/628 |
| 6,922,144 B2 | 7/2005 | Bulin | | |
| 6,975,236 B2 * | 12/2005 | Staples | ................ | A01G 25/167 340/602 |
| 6,978,794 B2 * | 12/2005 | Dukes | .................. | A01G 25/167 137/1 |
| 7,158,373 B2 * | 1/2007 | Smith | ....................... | G06F 1/16 361/679.18 |
| 7,187,299 B2 * | 3/2007 | Kunerth | ................ | G01L 19/083 340/539.1 |
| 7,219,545 B2 * | 5/2007 | Salzmann | ............. | G01F 23/242 73/290 R |
| 7,240,743 B2 * | 7/2007 | Buss | ........................ | G01N 1/08 175/20 |
| 7,258,005 B2 * | 8/2007 | Nyce | ..................... | G01F 23/263 73/304 C |
| 7,295,919 B2 | 11/2007 | Humphrey | | |
| 7,441,455 B2 * | 10/2008 | Vargas Da Silva | ..... | G01F 23/24 73/304 C |
| 7,661,307 B1 * | 2/2010 | Milone | .................. | G01F 23/18 73/290 R |
| 7,739,907 B2 * | 6/2010 | Boiarski | .............. | A61B 10/007 73/149 |
| 7,788,970 B2 * | 9/2010 | Hitt | ...................... | A01G 25/167 73/73 |
| 7,802,471 B2 * | 9/2010 | Sieh | ..................... | G01F 23/265 73/304 C |
| 8,100,006 B2 * | 1/2012 | Galloway | ........... | G01F 23/2968 73/290 R |
| 8,120,500 B2 * | 2/2012 | Tokhtuev | ............. | A61M 5/1684 340/612 |
| 8,776,595 B2 * | 7/2014 | Milone | .................. | G01F 23/24 73/304 C |
| 9,261,395 B2 * | 2/2016 | Shearer | ................ | G01F 23/268 |
| 9,488,513 B2 * | 11/2016 | Kumar | ................. | G01F 23/00 |
| 10,085,393 B2 * | 10/2018 | Hill | ...................... | A01G 25/167 |
| 10,203,238 B2 * | 2/2019 | Barrett | ................ | G01F 23/263 |
| 10,240,965 B2 * | 3/2019 | Kumar | ................. | G01F 23/268 |
| 2001/0037680 A1 * | 11/2001 | Buck | ..................... | G01F 23/265 73/304 C |
| 2002/0060576 A1 * | 5/2002 | Tominaga | ............ | G01N 27/048 324/715 |
| 2003/0080199 A1 * | 5/2003 | Condreva | ............ | A01G 25/167 239/63 |
| 2003/0155935 A1 * | 8/2003 | Klun | ...................... | G01N 33/03 324/664 |
| 2003/0230638 A1 * | 12/2003 | Dukes | ................... | A01G 25/167 239/200 |
| 2005/0172712 A1 * | 8/2005 | Nyce | ..................... | G01F 23/263 73/304 C |
| 2006/0139037 A1 * | 6/2006 | Hughes | ................ | G01N 33/246 324/696 |
| 2006/0144437 A1 * | 7/2006 | Dresselhaus | ......... | A01G 25/167 137/78.3 |
| 2007/0240506 A1 * | 10/2007 | Lin | ....................... | G01F 23/266 73/304 R |
| 2008/0053202 A1 * | 3/2008 | Rohklin | ................ | G01F 23/265 73/61.41 |
| 2008/0134779 A1 * | 6/2008 | Tung | ...................... | G01F 23/24 73/304 C |
| 2008/0189058 A1 * | 8/2008 | Merwin | ............... | G01F 23/0061 702/55 |
| 2009/0165552 A1 * | 7/2009 | Sieh | ..................... | G01F 23/265 73/304 C |
| 2009/0187357 A1 | 7/2009 | Ho | | |
| 2009/0237227 A1 * | 9/2009 | Ehrhart | ................ | A01D 75/18 340/441 |
| 2009/0301190 A1 * | 12/2009 | Ross, Jr. | .............. | G01F 25/0061 73/304 C |
| 2010/0141460 A1 * | 6/2010 | Tokhtuev | ............. | A61M 5/1684 340/621 |
| 2011/0093123 A1 * | 4/2011 | Alexanian | .............. | A01G 25/16 700/284 |
| 2011/0120219 A1 * | 5/2011 | Barlesi | ................ | G01F 23/268 73/304 C |
| 2011/0155262 A1 * | 6/2011 | Ante | ..................... | G01F 23/263 137/341 |
| 2012/0167678 A1 * | 7/2012 | Fusaro | .................... | G01F 23/24 73/304 C |
| 2012/0240675 A1 * | 9/2012 | Farmanyan | ............. | G01F 23/263 73/304 C |
| 2013/0061669 A1 * | 3/2013 | Bogdanchik | ........... | G01F 23/18 73/304 C |
| 2013/0297235 A1 * | 11/2013 | Oldfield | .............. | G01F 23/266 702/55 |
| 2014/0152323 A1 * | 6/2014 | Kumar | .................. | G01F 23/00 324/658 |
| 2015/0227142 A1 | 8/2015 | Hutchings | | |

(56) References Cited

U.S. PATENT DOCUMENTS

2015/0287313 A1     10/2015    Silvers
2017/0340147 A1*   11/2017    Hambrock ......... A47G 19/2227

OTHER PUBLICATIONS

Kelly Galloway, "Design Details for Septic Drainfield we are monitoring with Septic Sitter, Queens County, PE, Canada", Feb. 19, 2015. (Year: 2015).*

Kelly Galloway, "Detailed Septic Sitter data allows for unique onsite insights", Feb. 18, 2015. (Year: 2015).*

"Septic Tank Monitoring", CocoonTech.com, Apr. 21, 2010. (Year: 2010).*

ServersCheck, listing of informational videos on sensors with gateway computers, available on the internet at www.youtube.com/user/serverscheck/videos, particularly www.youtube.com/watch?v=MEr5hw75-A0 uploaded Mar. 18, 2013. (Year: 2013).*

International Search Report issued in PCT/US2017/035167 dated Aug. 14, 2017.

Written Opinion issued in PCT/US2017/035167 dated Aug. 14, 2017.

Burns, "The Evolution of Liquid Level Sensing", http://www.sensortips.com/capacitive/the-evolution-of-liquid-level-sensing/, Nov. 17, 2015; 10 pages.

"Molex Showcases Capacitive Fluid-Level Sensors at MD&M West" http://www.molex.com/molex/news/display_news.jsp?channel=New&channelId=8&oid=1258, Press Release, 2 pgs, Feb. 5, 2013.

Fulton et al., "Sensing the Future of Appliance Design", Appliance Design, 2 pgs., Feb. 2016.

Molex Capacitive Fluid Level Sensors, www.molex.com/link/capacitivesensors.html, 1 page; Copyright 2014.

Molex Capacitive Sensing, www.molex.com/link/capacitivesensing.html, 2 pages; Copyright 2015.

* cited by examiner

LIQUID HANDLING SYSTEM MONITORING SYSTEMS AND METHODS

CROSS-REFERENCE TO RELATED APPLICATION

This application claims benefit of priority from U.S. Provisional Patent Application No. 62/343,759, entitled "Septic System Monitoring System and Method," filed May 31, 2016, the entirety of which is incorporated by reference herein.

BRIEF DESCRIPTIONS OF THE DRAWINGS

DETAILED DESCRIPTION OF SEVERAL EMBODIMENTS

Systems and methods for monitoring and/or controlling septic systems and/or other liquid handling systems are described herein. Some embodiments may include computer-based data collection and monitoring systems that may use various sensors and controllers to monitor and/or control water and liquid levels in septic systems and/or other liquid storage systems. Systems may include customer premise equipment installed at a customer site and remote monitoring and reporting equipment that may be in communication with the customer premise equipment through a network such as the Internet. The embodiments disclosed herein use septic systems as examples of liquid storage systems that may be monitored and/or controlled. However, similar system elements and processes may be applied to other liquid storage systems, such as grease traps, mobile restrooms, grinder pumps, lift stations, etc.

Customer premise equipment may include hardware and software that is installed at a customer site. For example, customer premise equipment may include a main controller panel called the gateway, one or more sensors for sensing liquid handling system conditions, and/or one or more controllers for controlling septic system equipment. Software may be used to interact with the hardware. Software may include code which runs on the gateway and/or firmware on the interface board and on the sensors. The gateway may communicate with the sensors and controllers using local communication links. The gateway may communicate with a central monitoring center using an Internet connection. The gateway may send collected data to the monitoring center, where it may be processed and compared with acceptable levels. If required, the monitoring center may send notification to a person or entity on file as associated with the gateway regarding an issue with the monitored site (e.g., high tank levels, excessive pump run time, etc.).

Although the system components have been described with regard to septic system monitoring and control, those of ordinary skill in the art will appreciate that the gateway, sensors, and controllers can be installed in other liquid handling systems in the same manner as in the septic system example.

Figure 1:
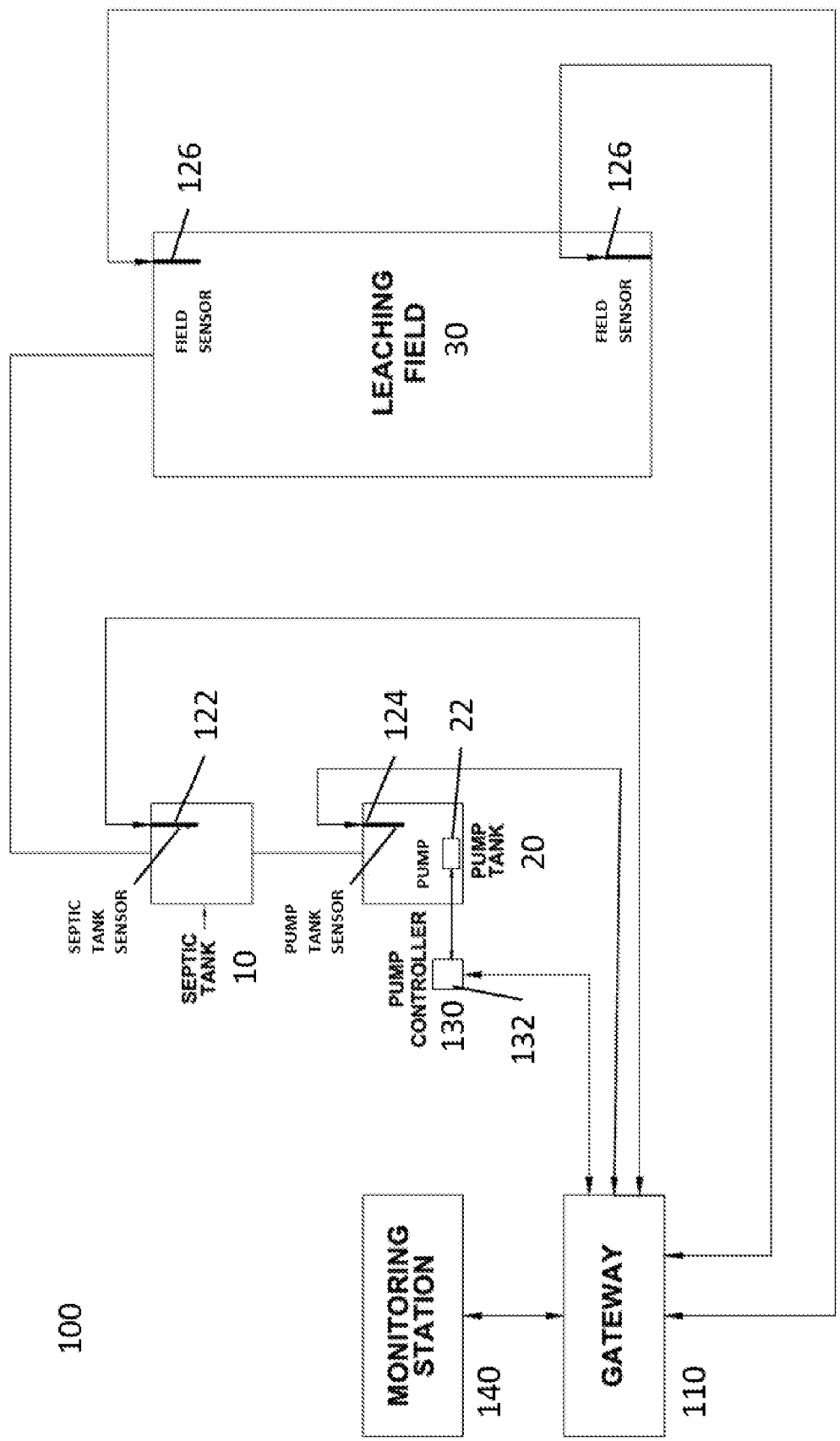
FIG. 1 shows a monitoring system configured to monitor a liquid handling system according to an embodiment of the invention.

FIG. 1 shows an example monitoring system 100 configured to monitor a liquid handling system (e.g., a septic system). The septic system may include septic tank 10, pump tank 20, and/or leaching field 30. System 100 may include septic tank sensors 122, pump tank sensors 124, and/or leaching field sensors 126. These sensors 122, 124, 126 may include liquid level sensors (e.g., 10 inch, 18 inch, and 47 inch level sensors) configured to sense liquid levels in septic tank 10, pump tank 20, and/or leaching field 30. Sensors 122, 124, 126 may include software and/or firmware for sensing liquid levels. Sensors 122, 124, 126 may be any off-the-shelf or proprietary liquid level sensors configured to be able to communicate with gateway 110.

The septic system may include one or more liquid level pumps 22. For example, pump 22 may be disposed in pump tank 20 and configured to pump fluid in pump tank 20. System 100 may include current and/or voltage sensors (e.g., pump sensor 132 for monitoring pump 22). Sensors 132 may include software and/or firmware for sensing voltage and/or current. Sensors 132 may be any off-the-shelf or proprietary current and/or voltage sensors configured to be able to communicate with gateway 110.

System 100 may include one or more pump controllers 130 (e.g., for monitoring and controlling pump 22). Pump controller 130 may include one or more relays configured to communicate with gateway 110 and control pump 22. Pump controller 130 may include software and/or firmware for controlling the relay. In some embodiments, pump controller 130 and pump sensor 132 may be combined into a single hardware unit.

System 100 may include gateway 110. Gateway 110 may be used to bridge communication with the sensors/controllers. In some embodiments, gateway 110 may include a single board computer along with a main board. The main board may include a power supply, rs485 connectors, general purpose input/output (GPIO), universal serial bus (USB), Ethernet, and/or a cellular modem socket, for example. The single board computer may run an operating system (e.g., Linux). The single board computer may run applications developed to run inside the operating system. The applications may perform functions such as communications to sensors/controllers, communications to monitoring station 140, enforcement of rules, and/or interaction with configuration files. Gateway 110 may use a message bus for communicating with customer premise equipment and/or communication protocol for communicating with monitoring station 140 over the Internet. Gateway 110 may be powered by a 13 VAC source from an external plug in transformer or from an internal 13 VAC transformer, for example. Gateway 110 may communicate with sensors 122, 124, 126, 132 and controller 130 using RS485 communications links at distances of 1000 feet or more, for example. Gateway 110 may communicate with monitoring station 140 using an Internet connection through a plug-in Ethernet port, a cellular modem, or WiFi, for example.

Monitoring station 140 may include a user portal providing user access to system 100, a datastore, a rules engine for providing rules to gateway 110, a site monitor for monitoring gateway 110 (and, by extension, sensors 122, 124, 126, 132), and/or a call center application for providing alerts about problems in system 100.

Figure 2A:
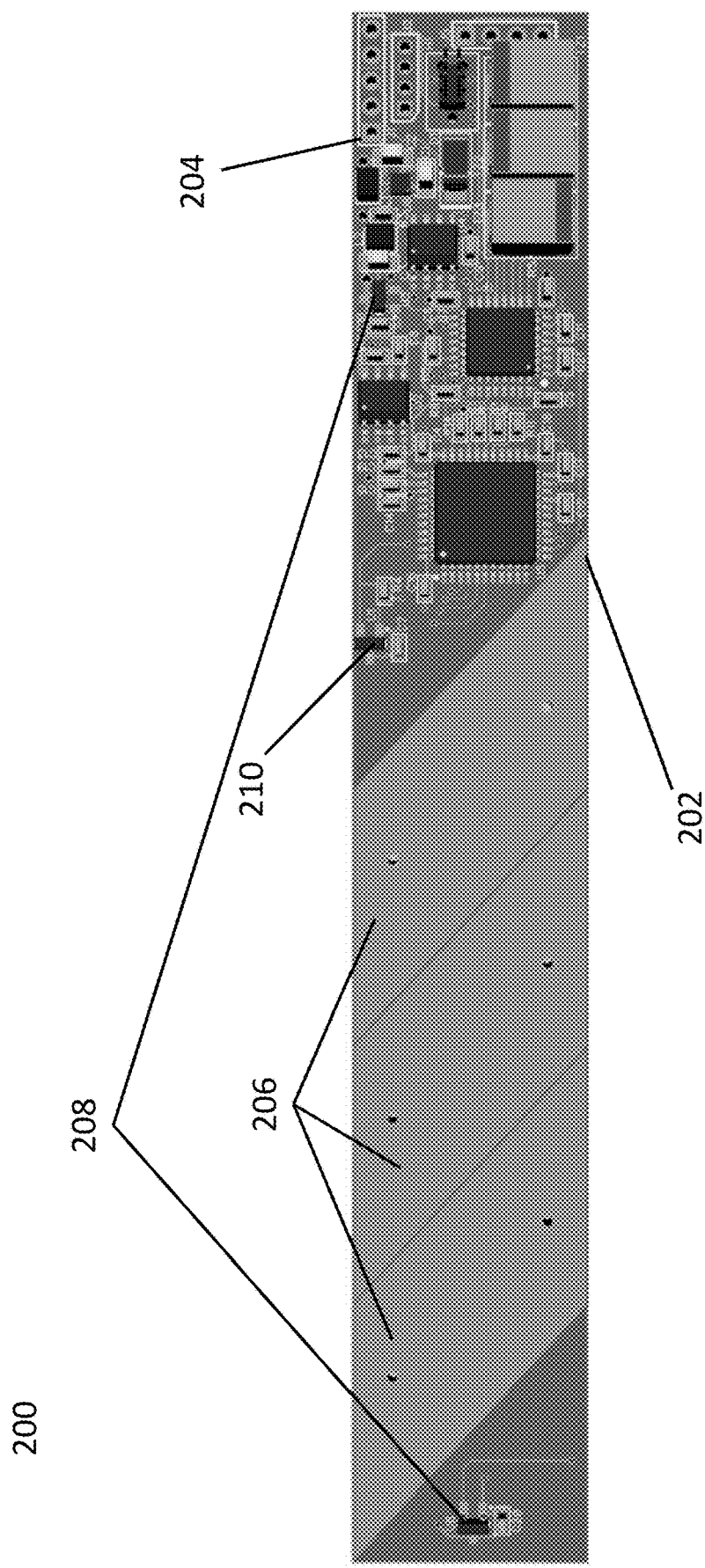
FIG. 2A shows a liquid level sensor according to an embodiment of the invention.
Figure 2B:
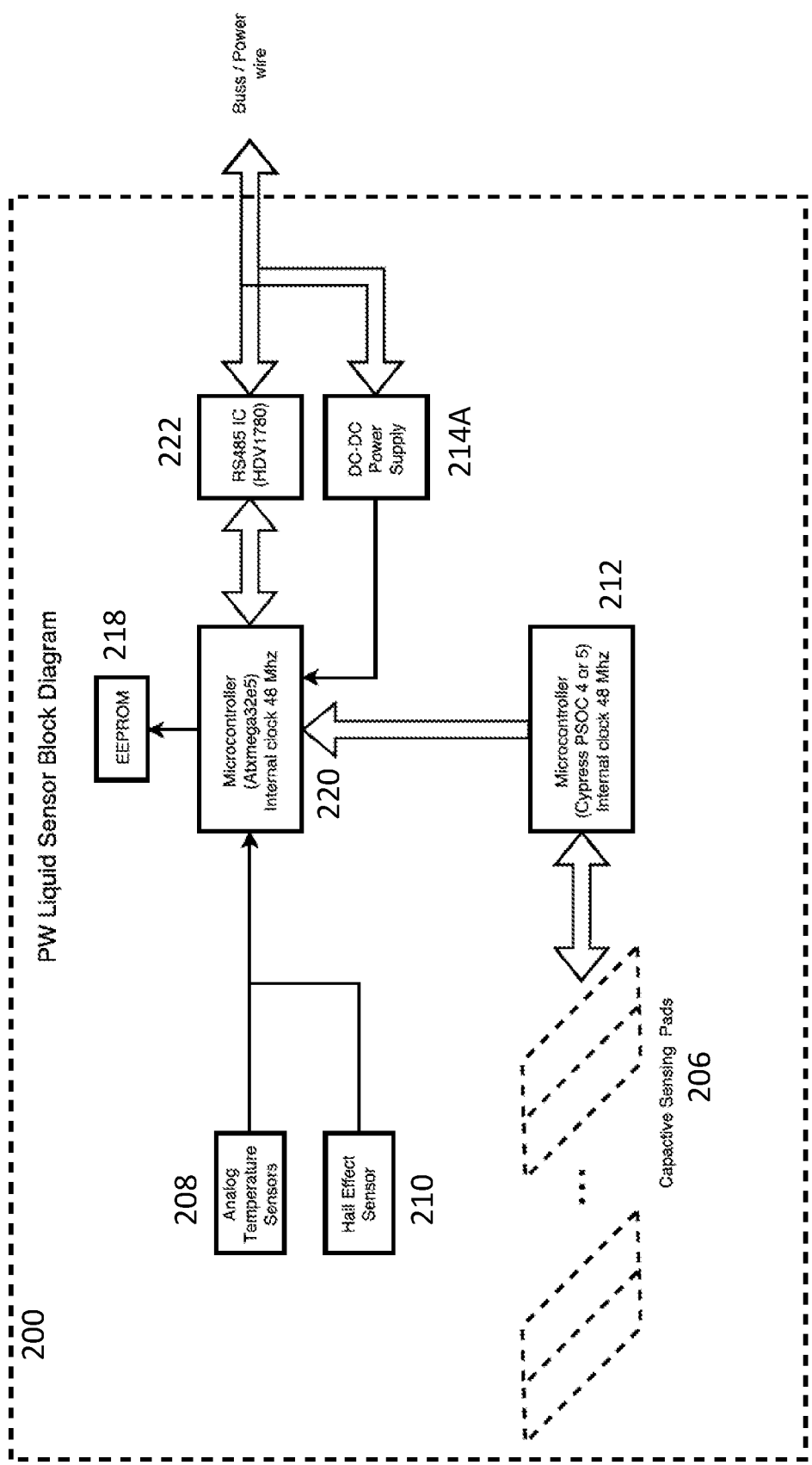
FIG. 2B is a block diagram of a liquid level sensor according to an embodiment of the invention.

FIG. 2A shows a liquid level sensor 200 according to an embodiment of the invention, and FIG. 2B is a block diagram of liquid level sensor 200. Liquid level sensor 200 may be used as one or more of sensors 122, 124, 126 of system 100. Liquid level sensor 200 may comprise a printed circuit board (PCB) 202 including measurement and control circuitry 204 and one or more sensor pads 206. Liquid level sensor 200 may be configured in a variety of lengths. For example, system 100 may include 18" liquid level sensors 200 and/or 47" liquid level sensors 200.

The 18" liquid level sensor 200 may be used to measure liquid level depth of up to 17 or 18 inches. The 18" liquid level sensor 200 may be used for multiple liquid level applications such as in leaching field 30. In some embodiments, the 18" sensor may be constructed using a PCB 202 that is approximately 1" wide by 18" long. FIG. 2A shows three sensor pads 206 for purposes of illustration, but in some embodiments there may be 17 sensor pads 206 along the length of the PCB 202, spaced equally at 1" intervals. Measurement and control circuitry 204 may be located at a top end of PCB 202. Sensor pads 206 may be copper foil or other conductive pads arranged on PCB 202 and electrically coupled to input pins of a processor included in measurement and control circuitry 204.

Liquid level sensor 200 may include one or more temperature sensors 208. For example, the embodiment of FIG. 2A includes two temperature sensors 208, one near the bottom and the other one near the top.

Figure 2C:
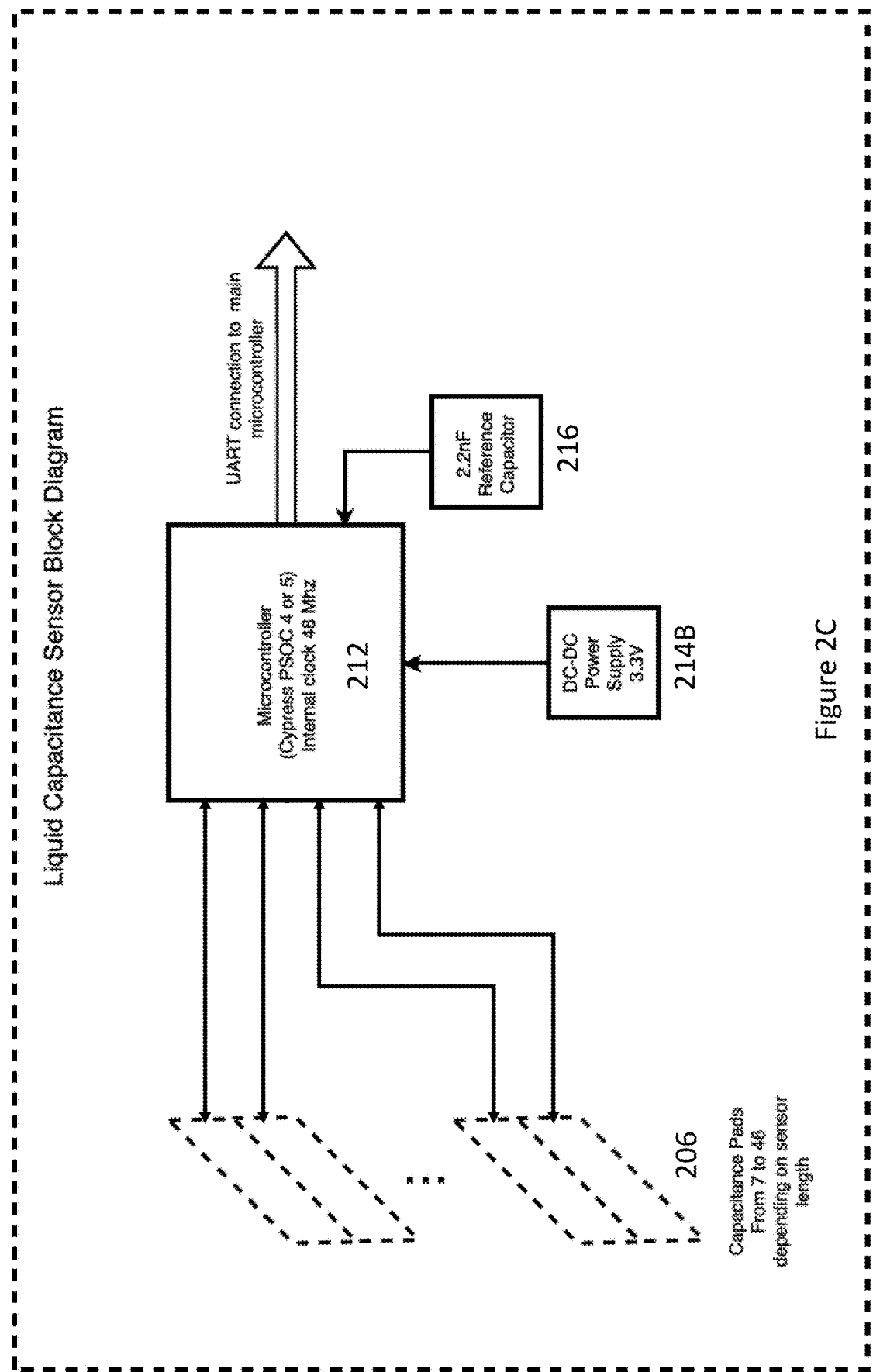
FIG. 2C is a block diagram of a capacitance sensor according to an embodiment of the invention.

Measurement and control circuitry 204 may include a processor (e.g., Cypress CPU (CY8C4245AXI-483)) 212 that may measure capacitance on each of the sensor pads 206. As shown in the detailed view of FIG. 2C, for example, processor 212 may use a self-capacitance measurement process to measure capacitance on sensor pads 206. For example, processor 212 may measure the capacitance between each of a plurality of single input pin of processor 212 (connected to a corresponding sensor pad 206 in this case) and ground. Processor 212 may measure the capacitance by driving current on the pin (e.g., using power supply 214, which may be a dedicated power supply 214B for this purpose) and measuring the voltage. When water (or other fluids, for example) is placed on or near the sensor pads 206, the measured capacitance may increase. Processor 212 may convert the sensor capacitance into a digital count. The numerical value of the count may provide a digital representation of the sensor capacitance. The value of the count may increase as the capacitance increases. As the water level rises over sensor pad 206, the capacitance increases, and the measured digital count increases, thus indicating the rise in water level.

Measurement and control circuitry 204 may include another processor (e.g., (ATXmega32E5)) 220 that may analyze and process measured capacitance for data correction and accuracy, as discussed below. Measurement and control circuitry 204 may include power supply 214 (which may comprise separate power supplies 214A for processor 220 and 214B for processor 212 in some embodiments). Measurement and control circuitry 204 may include memory (e.g., EEPROM) 218 for storing calibration data and/or other information. Measurement and control circuitry 204 may include an RS485 interface 222 (e.g., HVD1780 and associated components) configured to send processed capacitance information and/or temperature data to gateway 110.

Liquid level sensor 200 may employ a measurement correction process to stabilize readings and provide measurement accuracy with 0.1" resolution of liquid levels. This process may proceed as follows. Each sensor pad 206 may be formed in the shape of a parallelogram with an approximate angle of 45 degrees on the upper and lower edges of each pad 206. This arrangement may provide a shifting rate of capacitance increase or decrease as the water level changes with respect to each sensor pad 206. The center of sensor pad 206 may be the point where the rate of change is greatest for small variations in water level. As the water level rises or lowers across sensor pad 206 surface, the capacitance of that sensor pad 206 may increase or decrease. Measurement and control circuitry 204 may detect whether the total capacitance of sensor pad 206 is increasing or decreasing and thereby determine whether the water/liquid level is increasing or decreasing. Measurement and control circuitry 204 may use the capacitance information along with averaging techniques to establish the liquid level on sensor 200 with a high degree of accuracy.

Figure 2D:
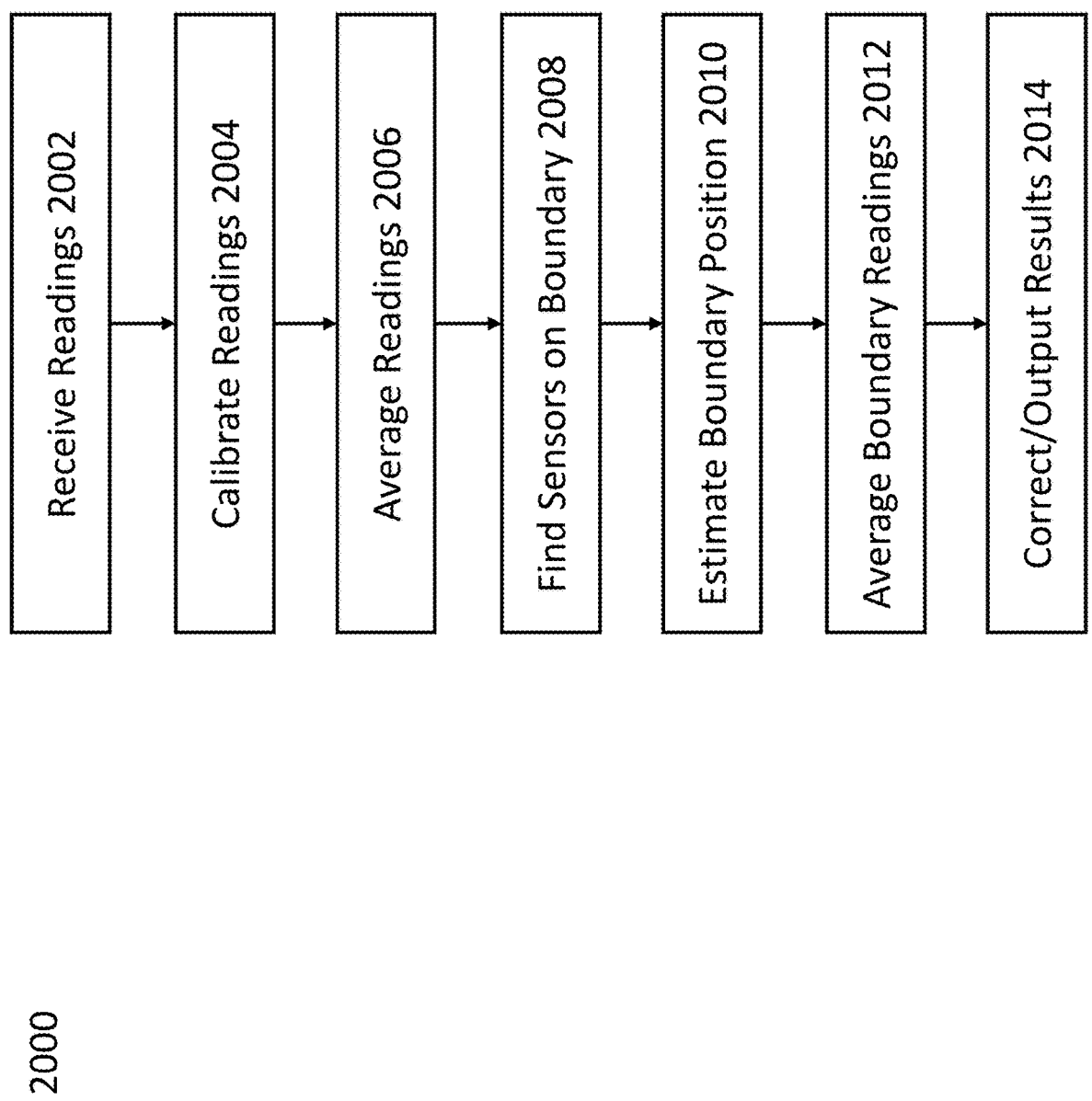
FIG. 2D is a flow diagram of a fluid level detection process according to an embodiment of the invention.

Specifically, in some embodiments, measurement and control circuitry 204 may detect fluid levels using process 2000 of FIG. 2D. Processor 212 may receive readings 2002 from each sensor pad 206 and report the readings to processor 220. Processor 220 may access calibration data for each sensor pad 206 to calibrate the readings 2004 (e.g., from memory 218). For example, due to imperfections and/or physical differences in individual sensor pads 206, the data output by each sensor pad 206 may be compared against a calibration value indicating a reading when sensor pad 206 is submerged up to its midpoint in water (or some other fluid). The calibration value may be established by testing sensor pad 206 prior to installation, for example. Sensor pads 206 reporting readings greater than the calibration value may be at least partially underwater, whereas sensor pads 206 reporting readings less than the calibration value may be at least partially above water. Processor 220 may generate a running average of the readings 2006 (e.g., averaging the last three readings received from each sensor pad 206).

Once the readings are obtained, processor 220 may analyze the readings to determine which sensor pads 206 are located on the boundary between the fluid (e.g., water) and the atmosphere (e.g., air). As noted above and as illustrated in FIGS. 2A-2C, sensor pads 206 may be parallelograms overlapping one another in height, so two sensor pads 206 may be positioned on the water-air boundary. Accordingly, processor 220 may identify the last sensor pad 206 having a reading greater than its calibration value and the first sensor pad 206 having a reading less than its calibration value, which may be adjacent to one another, as sensor pads 206 that are located on the water-air boundary. Processor 220 may estimate the boundary position with respect to each border sensor pad 206 based on the readings 2010. For example, processor 220 may determine a difference between the reading and the calibration value for each sensor pad 206. Given a known scaling factor for each sensor pad 206 (which may be assumed to be linear in some embodiments), processor 220 may be able to estimate how far the boundary is from the midpoint of the sensor pad 206. Processor 220 may average the boundary readings given by each sensor pad 206 to generate a final water level estimate 2012.

Processor 220 may report the estimate 2014 (e.g., to gateway 110 using RS485 interface 222).

In some embodiments, processor 220 may perform a correction process on the estimate before reporting. Processor 220 may employ one or more techniques to help ensure the accuracy and reliability of the water/liquid level readings. For example, processor 220 may use data from at least the bottom temperature sensor 208 for correction adjustments to the readings. As the temperature of the water changes, the measured capacitance may also change. In addition, the dielectric constant of water (and other liquids) may also change with temperature. By measuring the water temperature and then using a correction factor on the capacitance readings (based on the water temperature), processor 220 may correct the capacitance readings to take temperature variance factors into account and thereby improve accuracy. A correction factor may be generated for each sensor pad 206 (e.g., through testing prior to installation) and stored in memory 218. For example, the correction factor may be based on a known reading at a cold water temperature, a known reading at a hot water temperature, and an assumed linear relationship between the known readings.

In some embodiments, the aforementioned processing may be used to provide a moisture reading rather than a water level reading. For example, if sensor 200 is disposed in an area having a variable moisture level, processor 220 may analyze readings from each sensor pad 206 (or a subset thereof) against the calibration value, rather than only the two at a fluid boundary, and estimate a moisture level of the environment based on the detected reading and the scaling factor.

Processor 212 may be able to generate outputs distinguishing between fluids contacting sensor pad 206. For example, different media may have different dielectric constants, causing different readings on sensor pad 206. Air may have a dielectric constant of approximately 1, whereas water may have a dielectric constant of approximately 80. The large difference between dielectric constants of these two materials may allow processor 212 to readily distinguish between pads 206 that are contacting water and pads 206 that are contacting air. Some fluids, such as oil or grease, may have dielectric constants closer to air (e.g., approximately 2-5). In some embodiments, memory 218 may store calibration data for each sensor pad 206 based on testing with different fluids. Processor 220 may compare readings from sensor pads 206 against the calibration data for various fluid types in memory 218 to determine which fluid is being observed by sensor pads 206.

Liquid level sensor 200 may include a hall effect switch 210 that may be available for help in setting the address on the sensor for first time installation, as described below. Hall effect switch 210 may be activated by presenting a magnet to the area of board 202 where hall effect switch 210 is located.

The 47" liquid level sensor 200 may be used to measure liquid level depth of up to 46 or 47 inches. In some embodiments, the 47" liquid level sensor 200 may be used for measuring the liquid level in septic system tanks and pump tanks. The 47" liquid level sensor 200 may be constructed in a similar way as the 18" sensor, with pads 206 placed at 1 inch intervals and measurement and control circuitry 204 located at the top end of PCB 202. The 47" liquid level sensor 200 may include three temperature sensors 208, one at the bottom, one in the middle, and one near the top of PCB 202. The 47" liquid level sensor 200 may use a Cypress CPU (CY8C5467AXI-LP108) to measure capacitance. This is a bigger version of the CPU on the 18" sensor 200 example discussed above, with the ability to monitor all 47 pads on the 47" sensor 200. This processor may communicate with the second CPU (ATXmega32E5) and process readings similarly to the 18" sensor 200. The 47" liquid level sensor 200 may use same RS485 interface for communications with gateway 110. The 47" liquid level sensor 200 may use the same measurement correction processes as is used for the 18" sensor 200. The 47" liquid level sensor 200 may include hall effect switch 210 for potential use in addressing schemes, like the 18" sensor 200.

Figure 2E:
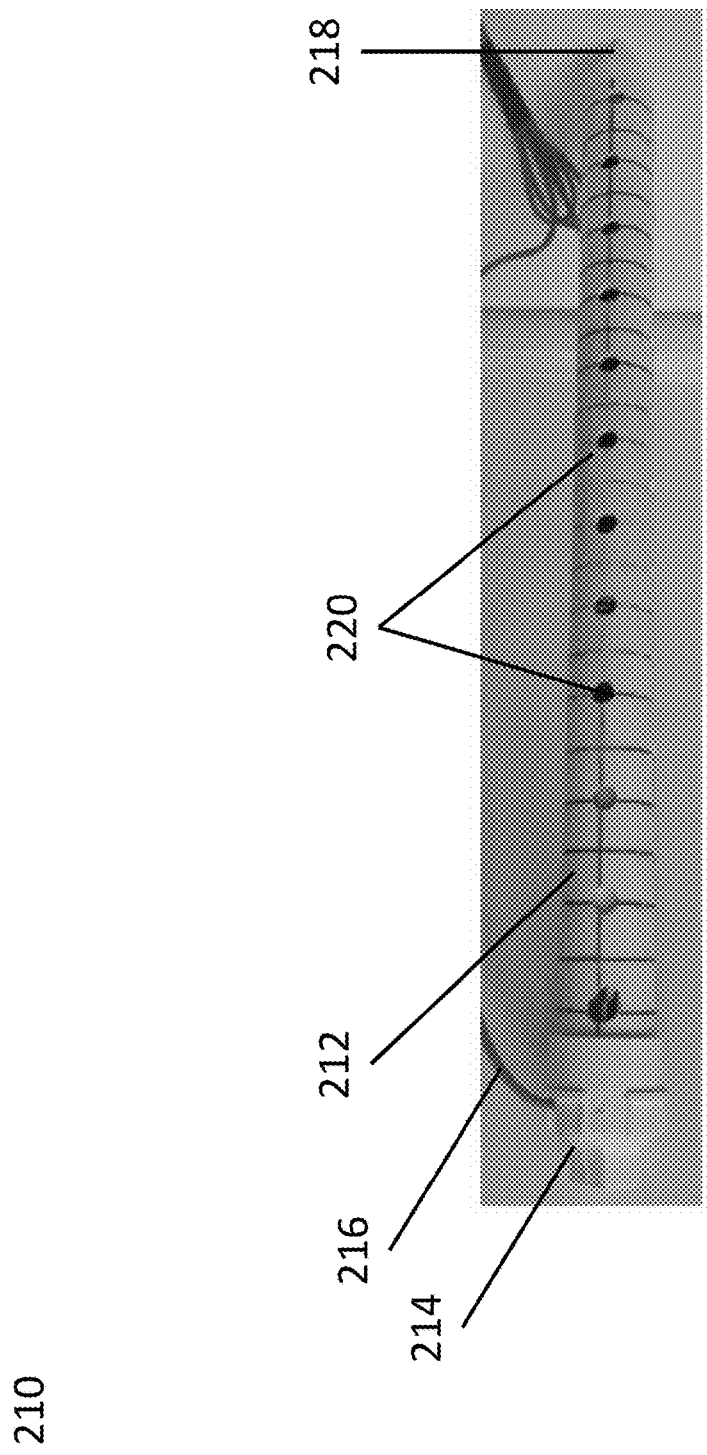
FIG. 2E shows a liquid level sensor enclosure according to an embodiment of the invention.

FIG. 2E shows a liquid level sensor enclosure 210 according to an embodiment of the invention. Enclosure 210 may house liquid level sensor 200 and may be placed inside leaching field 30. Enclosure 210 may include pipe 212 (e.g., 1.5" diameter PVC pipe in some embodiments) in which liquid level sensor 200 may be installed. Liquid level sensor 200 may be sealed inside pipe 212 by cap 214. Cap 214 may include a hole permitting sensor cable 216 to protrude from enclosure 210 and be wired to an input on gateway 110, for example. Enclosure 210 may include a pointed tip 218 at the bottom of enclosure 210. One or more holes 220 may be formed in pipe 212 to permit liquid in leaching field 30 to enter pipe 212 and be measured by liquid level sensor 200 therein.

Figure 3:
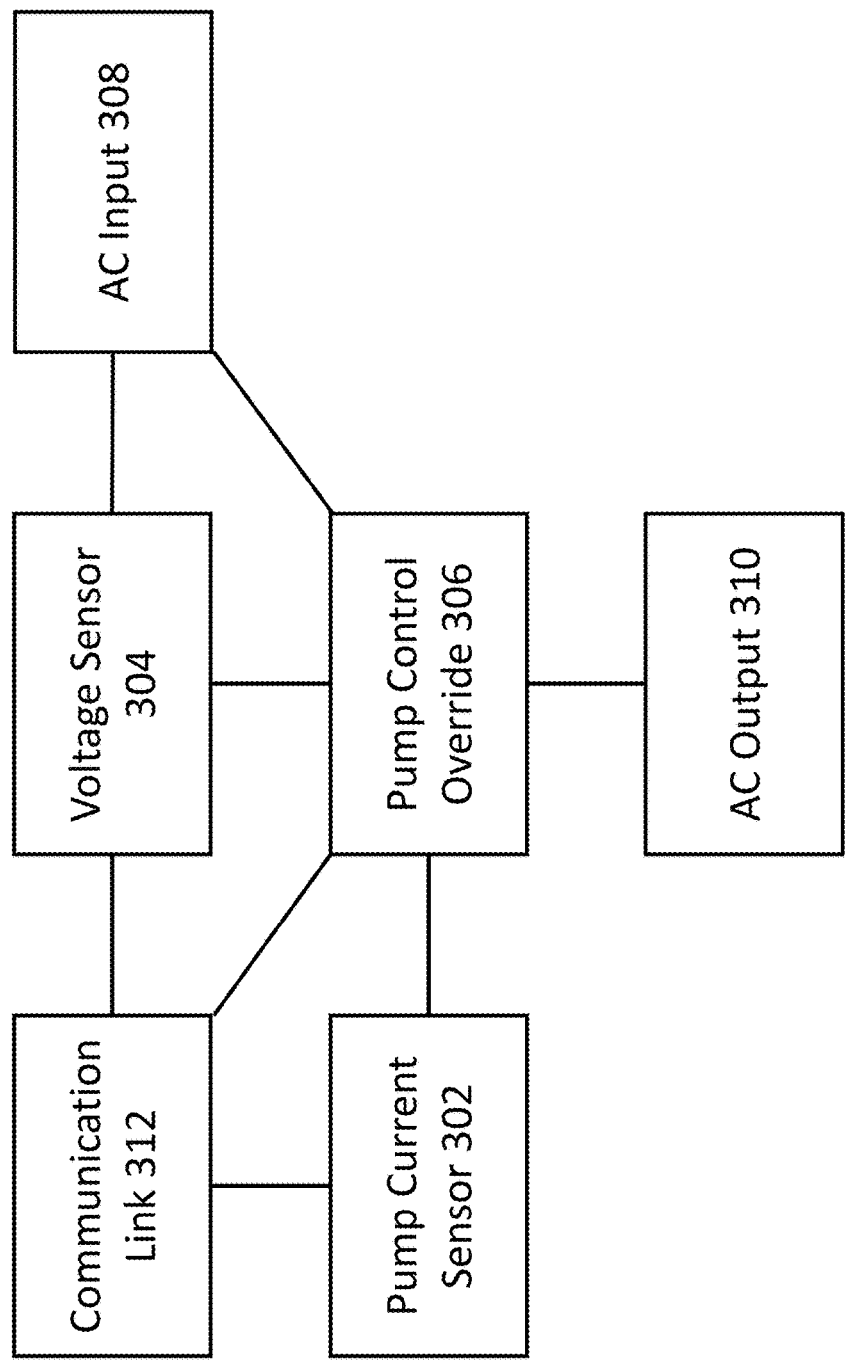
FIG. 3 is a block diagram of a pump controller according to an embodiment of the invention.

FIG. 3 is a block diagram of pump controller 130 according to an embodiment of the invention. Pump controller 130 may include pump current sensor 302 configured to measure pump current of a controlled liquid pump (e.g., pump 22). Pump controller 130 may include voltage sensor 304 configured to monitor a power input to pump 22 (e.g., 120V AC input). Pump controller 130 may include communication link 312 (e.g., RS485 link) configured to send data collected by pump current sensor 302 and voltage sensor 304 to gateway 110.

Pump controller 130 may include pump control override switch 306 configured to control pump 22 by switching AC input 308 on or off for pump 22. For example, AC input 130 may be wired into pump controller 130, and pump controller 130 may include an AC receptacle (AC output 310) into which pump 22 power cord may be plugged. Pump control override switch 306 may be configured to open or close the circuit between AC input 308 and AC output 310.

Pump controller 130 may operate in a monitor only mode where it checks pump 22 current levels and checks for the presence of 120 VAC and reports back to gateway 110. Pump controller 130 may operate in a monitor and control mode where it monitors pump 22 current levels and 120 VAC input and reports back to gateway 110. Gateway 110 may command pump controller 130 to override the normal pump float switch if necessary to turn the pump off or on using pump control override switch 306. For example, if the float switch fails open, pump controller 130 may override and turn pump 22 on, or if the float switch fails closed, pump controller 130 may override and turn pump 22 off. Due to level sensor 200 and pump controller 130 sending readings back to gateway 110, gateway 110 may be able to determine at which water levels the float switch usually turns on and off. If gateway 110 detects water above the level at which the float switch usually turns on, gateway 110 may direct pump controller 130 to override and turn pump 22 on. If gateway 110 detects water below the level at which the float switch usually turns off, gateway 110 may direct pump controller 130 to override and turn pump 22 off.

In monitor and control mode, gateway 110 may monitor the liquid level in the pump tank (via one of the level sensors 200) and check for an over-full condition. If an over-full condition is detected, gateway 110 may send a signal to pump controller 130 communication link 312 to turn on pump 22 until the liquid level is back to a safe value. If pump controller 130 is a continuous on condition for pump 22, gateway 110 may receive this data from communication link 312 and may send a command back to pump controller 130 communication link 312 to turn pump 22 off.

Figure 4:
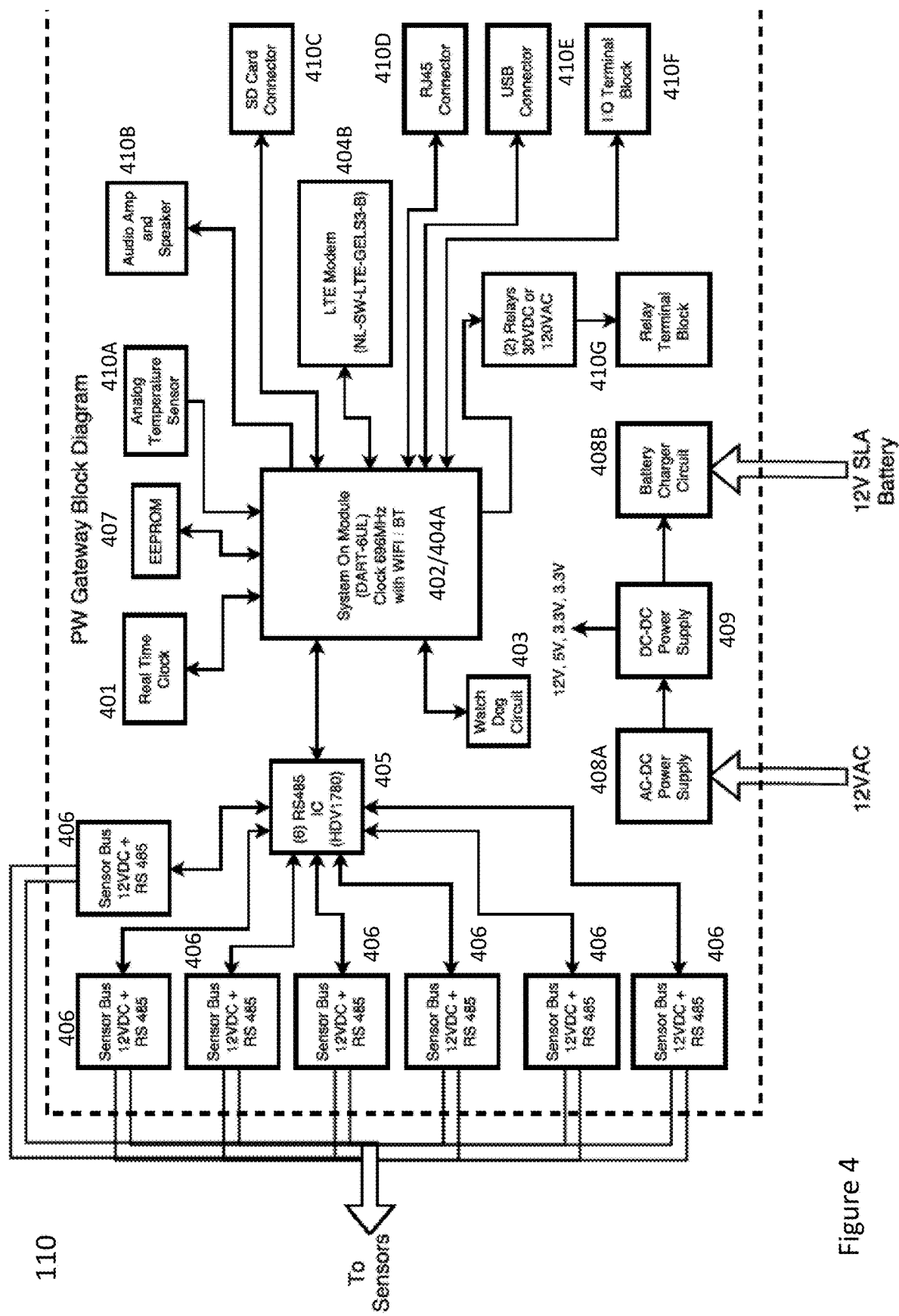
FIG. 4 is a block diagram of a gateway according to an embodiment of the invention.

FIG. 4 is a block diagram of gateway 110 according to an embodiment of the invention. Gateway 110 may include one or more components mounted on a main interface controller board 400. Components may include SBC 402, communication systems 404 (e.g., WiFi/Bluetooth 404A and/or modem 404B) for communication with monitoring station 140, external interfaces 410 (e.g., temperature sensor 410A, audio amp and speaker 410B, SD card slot 410C, RJ45 connector 410D, USB connector 410E, I/O terminal block 410F, and/or relays with relay terminal block 410G), RS485 circuit 405 and busses 406 for communicating with sensors and/or controllers, clock 401, memory (e.g., EEPROM) 407, watch dog circuit 403, and/or power connections 408 that may be coupled to one or more power sources (not shown), such as an AC power source (connection 408A) converted to DC and outputted to components on board 400 through low voltage DC power source 409 and/or backup battery (connection 408B).

Figure 5:
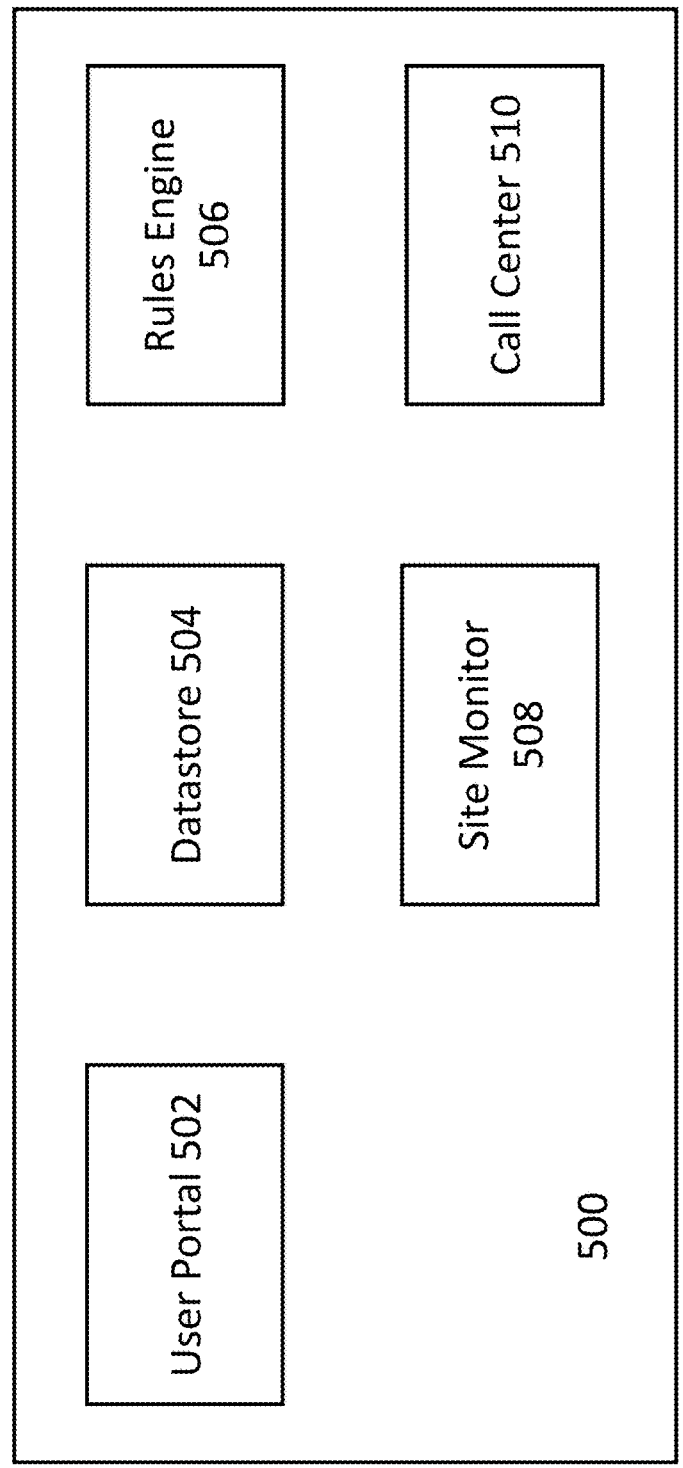
FIG. 5 is a block diagram of a monitoring station according to an embodiment of the invention.

FIG. 5 is a block diagram of monitoring station 140 according to an embodiment of the invention. Monitoring station 140 may comprise, for example, computer 500 configured to provide a web-based interface or other user interface. Monitoring station 140 may include, for example, user portal 502, datastore 504, rules engine 506, site monitor 508, and/or call center application 510. These elements may be implemented by computer 500 in hardware, software, and/or firmware.

User portal 502 may provide a user interface for describing sensors, configuring sensors (e.g., setting a height offset if the sensor doesn't reach the bottom of the tank), defining graphs for status display, displaying status of monitored sites, and/or controlling user access to data and/or controls for specific sites (e.g., requiring and processing user login for site access). Portal 502 may show the current state of system 100 (e.g., whether sensors 122, 124, 126 and/or gateway 110 are online and when they last checked in, network stats, current levels and relay positions (on/off), software versions, and overall system health). Additionally, the current status may show if any event is ongoing and/or if something is in an alarm condition. Portal 502 may show historical status based on data collected by gateway 110 and stored in datastore 504 (e.g., graphs created from a time series of sensor data trended to determine overall health, performance, and history of the system).

Rules engine 506 may define conditions (for example if liquid level is above a threshold), and set what action to take. The action may be to send an email and/or text. The action may be to notify a call center and have a call center operator follow a playbook. The action may be to call another rule.

Site monitor 508 may communicate with gateway 110, for example to receive sensor readings and/or status from gateway 110. Configurations set on portal 502 may be sent to gateway 110. When a new version of gateway software is available, an update may be pushed to gateway 110.

Call center application 510 may provide a user interface for responding to problems with system 100. For example, as noted above, rules engine 506 may notify the call center in response to detecting a condition. Call center application 510 may display a playbook for a user to follow to address the condition (e.g., contact homeowner, communicate with technician, explain condition, etc.).

Figure 6:
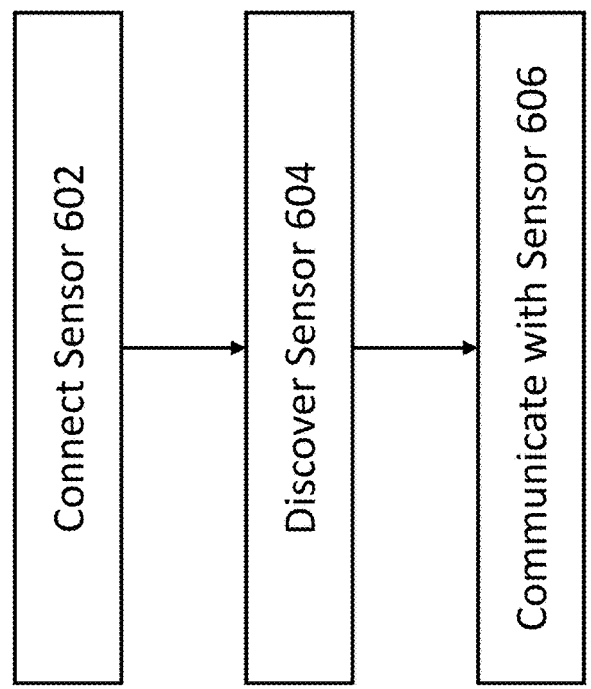
FIG. 6 is a flow diagram of a setup process according to an embodiment of the invention.

FIG. 6 is a flow diagram of a setup process 600 according to an embodiment of the invention. Setup process 600 is shown for connecting and provisioning a single sensor 122, 124, 126 within system 100. For systems with multiple sensors, setup process 600 may be performed for each sensor. Process 600 may be performed prior to system 100 installation and/or as system 100 is installed on site. Process 600 may correlate physical sensors in the septic system with communication ports of gateway 110. Setup process 600 may be performed on startup, as directed by monitoring station 140, and/or periodically.

First, the sensor may be connected 602. This example uses liquid level sensor 200 being used as septic tank sensor 122 for illustration purposes, although process 600 may be similar for other sensors. For example, sensor 200 may be coupled to communication port 406 of gateway 110.

Once sensor 200 is connected, gateway 110 may perform a discovery process 604. To discover sensor 200, gateway 110 may send a communication by communication port 406 to a default address for sensor 200 (e.g., 0x00). Sensor 200 may be configured to listen to messages with the address 0x00. Sensor 200 may respond with an ID, but may wait a random amount of time before responding (e.g., up to 1 s). This random time may be regenerated each time gateway 110 sends a message at the default address. Gateway 110 may wait up to 1 s for responses. Gateway 110 may retry sending the message in case of collision. Once a valid ID is returned, gateway 110 may send an address assignment to the 0x00 address along with the ID. Only the sensor 200 whose ID matches may accept the address assignment. Sensors may be identified by a bus number (1-5) and a sensor address (1-255). The sensor address may be made unique for each sensor on a bus to enable the communication to physically work. Each sensor at a site may have a unique address, so that sensors may be referred to by address. As sensors are detected, they may automatically receive a next available address and may be visible in user portal 502 of monitoring station 140 (e.g., where they may be monitored, labeled, etc.). Gateway 110 may repeat discovery process 604 until there are no responses on address 0x00 (e.g., allowing detection of multiple sensors). If gateway 110 detects multiple sensors with the same address, it may reassign the address on one or more of them.

Once sensor 200 is detected and assigned, gateway 110 and sensor 200 may communicate with one another 606. As discussed above, sensor 200 may send sensor readings and/or errors to gateway 110. In addition, gateway 110 may broadcast its serial number (e.g., on address 0). Sensor 200 may store the serial number, and if gateway 110 serial number does not match, sensor 200 may reset its address. This may cover the case when sensors are transferred from one site to another. Response CRC errors may be counted and reported to gateway 110, providing insight into possible wiring issues or address collision issues. Gateway 110 may reset any address on any sensor 200 (e.g., in response to a command from monitoring station 140 made through user portal 502).

Hall effect element 210 of sensor 200 may be activated (e.g., by a user), and the magnetization may be detected at gateway 110. This feature may be used for identifying sensors. For example, this feature may be used during provisioning to label sensors in user portal 502 with description (e.g., Tank #1, Field B, etc.), or in troubleshooting (e.g., determining which physical sensor in the field corresponds to which entry in user portal 502). In some embodiments, in addition to or instead of hall effect element 210, sensor 200 may include a barcode. A user may be able to use a scanner-equipped device (e.g., a smartphone or other portable computing device) including a location detection feature (e.g., a GPS transceiver) to scan the barcode and determine the location of the scanner-equipped device at the time of the scan. The scanner-equipped device may transmit this information to gateway 110, allowing gateway 110 to log the physical location of sensor 200 corresponding to the scanned barcode.

Figure 7:
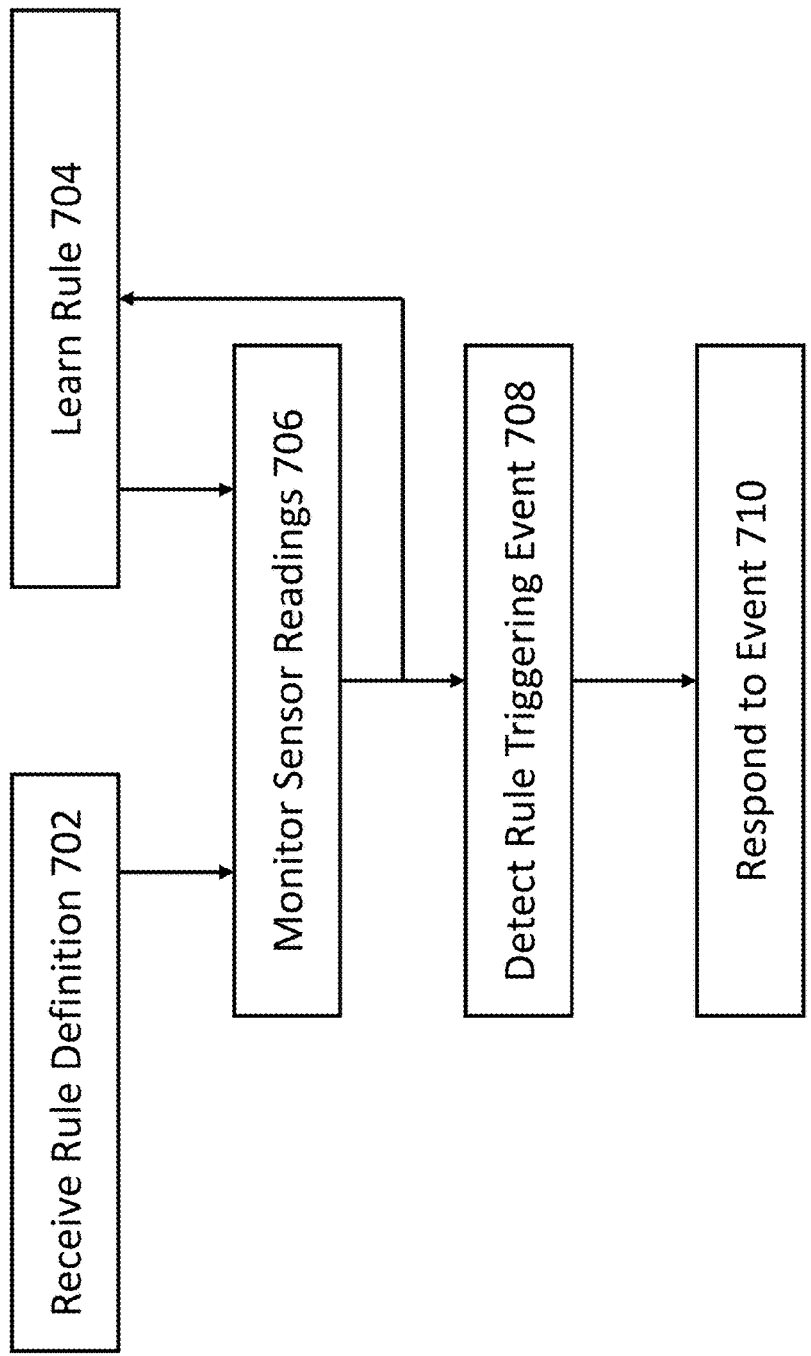
FIG. 7 is a flow diagram of a rules evaluation process according to an embodiment of the invention.

FIG. 7 is a flow diagram of a rules evaluation process 700 according to an embodiment of the invention. Rules may be established and enforced to enable automatic action in response to system 100 events. Rules may be established by monitoring station 140 (e.g., using rules engine 506). In some embodiments, rules may be stored by monitoring station 140 and gateway 110 so that gateway 110 may enforce rules even if monitoring station 140 and gateway 110 become disconnected.

To start rules evaluation process 700, rules may be established. For example, monitoring station 140 and/or gateway 110 may receive rule definitions 702. Rule definitions may be received from user input via user portal 502 and/or default rules from datastore 504 in some embodiments. Rule definitions may establish what action should be taken when certain criteria are met. An example of a rule may be if a tank water level hits a certain height, a text/email should be sent and the pump control should be initiated to turn on the pump. Another example rule may be if something critical happens (e.g., level shows the tank is going to overflow), a call center should be notified and a technician should be dispatched.

Gateway 110 may monitor sensor readings to identify events that may trigger rule enforcement 706. For example, gateway 110 may receive data from sensors as described above. For example, gateway 110 may poll data from sensors periodically (e.g., every 10 seconds). Gateway 110 may send collected data to monitoring station 140, and monitoring station 140 may store collected data in datastore 504. The reporting interval from gateway 110 to monitoring station 140 may be defined via user portal 502 and/or default rules from datastore 504. Reports can be batched to save on data usage if needed (e.g., to optimize cellular data usage for embodiments wherein gateway 110 accesses the Internet to connect with monitoring station 140 using a cellular modem).

In some embodiments, monitoring station 140 and/or gateway 110 may include a learning engine configured to learn rules 704. For example, the learning engine may take data that has been reported by sensors and use that data to establish a steady state baseline. A suggested rule may say if behavior is outside of regular steady state, an alarm should be trigged. A specific example may be in a pump based system, wherein the learning engine may be able to know the height of the floats in the tank by learning the liquid level never gets above X inches in height as detected by a specific sensor 200, and when it reaches X, the pump turns on. Rules engine may learn the height of the off float at Y inches by knowing the liquid level when the pump's power draw is back to zero.

If gateway 110 and/or monitoring station 140 detect a rule triggering event within the sensor data 708, gateway 110 and/or monitoring station 140 may respond to the event by performing the action specified by the rule 710.

A few examples of rules that may be defined in the rules engine may be as follows. However, any rule may be defined to meet whatever conditions are useful to the maintenance and operation of system 100.

If liquid level exceeds 4 inches in sensor 200 for more than 2 days, action is to send email/text to home owner and service provide and additionally have call center schedule an appointment with service provider to see if the service provider can restore health in the field.

If temperature is below freezing in tank for more than 1 day, action is to schedule appointment with service provider to bring in heaters so tank doesn't back up in to house.

If liquid level goes above float height, action is dispatch service provider to fix floats.

If liquid level in tank is zero, action is to notify service provider to notify local regulator that tank has just been pumped.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A monitoring system for monitoring a liquid handling system, the monitoring system comprising:
   at least one liquid level sensor comprising:
      a first processor configured to monitor and determine at least one liquid level of at least one liquid handling element,
      a temperature sensor in communication with the first processor such that the first processor is configured to adjust the liquid level based on a temperature measured by the temperature sensor of a liquid contained in the liquid handling element, and
      multiple capacitance sensors that provide a shifting rate of capacitance change as the liquid level varies with respect to each sensor, wherein the shifting rate is the greatest at the center of each capacitance sensor;
   a pump controller configured to monitor and control at least one liquid pump disposed in the at least one liquid handling element;
   a gateway computer in communication with the at least one liquid level sensor and the pump controller, the gateway computer comprising a second processor disposed within the gateway computer, the gateway computer being configured to:
      receive, at the second processor, readings determined by the first processor from the at least one liquid level sensor and data from at least one pump controller sensor of the pump controller;

report, by the second processor, information describing the readings of the at least one liquid level sensor and the data from at least one pump controller sensor to at least one monitoring station through at least one network;

automatically determine, by the second processor, a baseline liquid level of the at least one liquid handling element from at least a portion of the readings;

identify, by the second processor, at least one rule-triggering event comprising a deviation from the baseline liquid level indicated by at least one of the readings; and perform, by the second processor, at least one action in response to identifying the deviation from the baseline liquid level, wherein performing the at least one action comprises directing the pump controller by the second processor to activate or deactivate the at least one liquid pump.

2. The monitoring system of claim 1, wherein the capacitance sensors are disposed at different heights within the at least one liquid handling element; and
wherein the first processor is configured to determine, from a capacitance measurement from at least one of the capacitance sensors, the liquid level within the at least one liquid handling element.

3. The monitoring system of claim 1, wherein the at least one liquid level sensor comprises:
a tube having at least one hole formed in a sidewall thereof, and
sensor electronics disposed within the tube.

4. The monitoring system of claim 1,
wherein the at least one pump controller comprises at least one pump controller sensor configured to monitor pump operation, and wherein the data from at least one pump controller sensor comprises at least one of measurements of pump current and input power of the controlled liquid pump.

5. The monitoring system of claim 1, wherein the at least one pump controller comprises
at least one override controller configured to activate or deactivate the at least one liquid pump in response to the data from the at least one pump controller sensor or a command from the at least one gateway computer.

6. The monitoring system of claim 1, further comprising the at least one monitoring station.

7. The monitoring system of claim 6, wherein the at least one monitoring station comprises at least one computer configured to:
display the information describing the readings;
define the at least one rule;
perform at least one action in response to identifying the at least one rule-triggering event in accordance with the at least one rule; or
a combination thereof.

8. The monitoring system of claim 1, wherein the gateway computer is further configured to receive the at least one rule from the at least one monitoring station.

9. The monitoring system of claim 1, wherein the gateway computer is further configured to formulate the at least one rule based on the readings.

10. The monitoring system of claim 1, wherein the at least one action comprises a corrective action, generating an alert, or a combination thereof.

11. The monitoring system of claim 1, wherein the capacitors are parallelogram shaped with an approximate angle of 45 degrees on the upper and lower edges of each capacitor.

12. A monitoring method for monitoring a liquid handling system, the liquid handling system comprising at least one liquid level sensor, a pump controller and a gateway computer, the pump controller being configured to monitor and control at least one liquid pump disposed in the at least one liquid handling element, the monitoring method comprising:
monitoring and determining, by a first processor of at least one liquid level sensor, at least one liquid level of at least one liquid handling element wherein the liquid level sensor includes multiple capacitance sensors that provide a shifting rate of capacitance change as the liquid level varies with respect to each sensor and the shifting rate is the greatest at the center of each capacitance sensor;
adjusting, by the first processor, the liquid level of a liquid contained in the liquid handling element based on a temperature measured by a temperature sensor built-in the liquid level sensor;
receiving, by a second processor disposed within the gateway computer in communication with the at least one liquid level sensor and the pump controller, readings determined by the first processor from the at least one liquid level sensor and data from at least one pump controller sensor of the pump controller;
reporting, by the second processor, information describing the readings of the at least one liquid level sensor and the data from at least one pump controller sensor to at least one monitoring station through at least one network;
automatically determining, by the second processor, a baseline liquid level of at least one liquid handling element from at least a portion of the readings;
identifying, by the second processor, at least one rule-triggering event comprising a deviation from the baseline liquid level indicated by at least one of the readings; and
performing, by the second processor, at least one action in response to identifying the deviation from the baseline liquid level, wherein performing the at least one action comprises directing the pump controller by the second processor to activate or deactivate the at least one liquid pump.

13. The monitoring method of claim 12, wherein monitoring the at least one liquid level comprises determining, by the first processor from a capacitance measurement from at least one of the capacitance sensors disposed at different heights within the at least one liquid handling element, a liquid level within the at least one liquid handling element.

14. The monitoring method of claim 12, further comprising:
wherein the data from the at least one pump controller sensor of the at least one pump controller comprises at least one of measurements of pump current and input power of the controlled liquid pump.

15. The monitoring method of claim 12, further comprising activating or deactivating, by the at least one pump controller, the at least one liquid pump in response to the data from at least one pump controller sensor or a command from the at least one gateway computer.

16. The monitoring method of claim 12, further comprising:
displaying, by the at least one monitoring station, the information describing the readings;
defining, by the at least one monitoring station, the at least one rule;

performing, by the at least one monitoring station, at least one action in response to identifying the at least one rule-triggering event in accordance with the at least one rule; or a combination thereof.

17. The monitoring method of claim 12, further comprising formulating, by the gateway computer, the at least one rule based on the readings.

18. The monitoring method of claim 12, wherein the at least one action comprises a corrective action, generating an alert, or a combination thereof.

19. The monitoring method of claim 12, wherein the capacitors are parallelogram shaped with an approximate angle of 45 degrees on the upper and lower edges of each capacitor.

* * * * *